United States Patent
Schlag

(10) Patent No.: US 9,447,922 B2
(45) Date of Patent: Sep. 20, 2016

(54) INTERNAL HEATING OF A FLUID IN A STORAGE TANK

(75) Inventor: Harald Schlag, Rüsselsheim (DE)

(73) Assignee: GM Global Technology Operations LLC, Detroit, MI (US)

(*) Notice: Subject to any disclaimer, the term of this patent is extended or adjusted under 35 U.S.C. 154(b) by 2419 days.

(21) Appl. No.: 11/595,581

(22) Filed: Nov. 8, 2006

(65) Prior Publication Data

US 2008/0105691 A1    May 8, 2008

(51) Int. Cl.
*F17C 7/00* (2006.01)
*F17C 5/06* (2006.01)

(52) U.S. Cl.
CPC . *F17C 7/00* (2013.01); *F17C 5/06* (2013.01); *F17C 2201/0104* (2013.01); *F17C 2201/056* (2013.01); *F17C 2203/03* (2013.01); *F17C 2203/0604* (2013.01); *F17C 2203/0617* (2013.01); *F17C 2205/0352* (2013.01); *F17C 2221/011* (2013.01); *F17C 2221/012* (2013.01); *F17C 2221/014* (2013.01); *F17C 2221/016* (2013.01); *F17C 2221/017* (2013.01); *F17C 2223/0123* (2013.01); *F17C 2223/036* (2013.01); *F17C 2225/0123* (2013.01); *F17C 2225/036* (2013.01); *F17C 2227/0302* (2013.01); *F17C 2227/0337* (2013.01); *F17C 2227/0372* (2013.01); *F17C 2227/0379* (2013.01); *F17C 2260/025* (2013.01); *F17C 2270/0184* (2013.01); *Y02E 60/321* (2013.01)

(58) Field of Classification Search
CPC ..... F17C 7/00; F17C 5/06; F17C 2201/0104

USPC .......... 220/581, 560.14, 562, 560.04, 560.12
See application file for complete search history.

(56) References Cited

U.S. PATENT DOCUMENTS

| | | | | |
|---|---|---|---|---|
| 2,260,357 | A * | 10/1941 | Zenner | 62/48.1 |
| 2,611,512 | A * | 9/1952 | Fashay | 220/88.1 |
| 2,707,377 | A * | 5/1955 | Morrison | 62/48.3 |
| 2,998,708 | A * | 9/1961 | Skinner | 62/45.1 |
| 3,250,420 | A * | 5/1966 | Kohn | 220/581 |
| 3,435,896 | A * | 4/1969 | Williams | 166/75.11 |
| 3,966,078 | A * | 6/1976 | Johnson et al. | 220/746 |
| 4,736,779 | A * | 4/1988 | Bernauer | 141/4 |
| 5,357,758 | A * | 10/1994 | Andonian | 62/45.1 |
| 5,551,590 | A * | 9/1996 | Mazur et al. | 220/23.83 |
| 5,722,556 | A * | 3/1998 | Ota et al. | 220/367.1 |
| 6,263,902 | B1 * | 7/2001 | Booth | 137/264 |
| 6,634,519 | B2 * | 10/2003 | Pelloux-Gervais et al. | 220/560.1 |
| 6,666,034 | B1 * | 12/2003 | Guan et al. | 62/46.1 |
| 6,758,244 | B2 * | 7/2004 | Workman et al. | 138/89 |

(Continued)

FOREIGN PATENT DOCUMENTS

| | | |
|---|---|---|
| AT | 341485 | 2/1978 |
| DE | 688949 | 3/1940 |

(Continued)

*Primary Examiner* — Fenn Mathew
(74) *Attorney, Agent, or Firm* — Fraser Clemens Martin & Miller LLC; James D. Miller

(57) ABSTRACT

A fluid storage tank is disclosed, the storage tank including a first conduit disposed therein substantially adjacent an inner surface of a sidewall of the storage tank, and wherein the inner surface facilitates a heating of the first conduit and a fluid in the first conduit during extraction thereof from the storage tank.

20 Claims, 1 Drawing Sheet

(56) References Cited

U.S. PATENT DOCUMENTS

| | | | |
|---|---|---|---|
| 7,641,068 B2* | 1/2010 | Immel et al. | 220/560.1 |
| 2003/0082427 A1* | 5/2003 | Prasad et al. | 429/34 |
| 2003/0154728 A1 | 8/2003 | Perin et al. | |
| 2006/0096302 A1* | 5/2006 | Pechtold | 62/45.1 |
| 2007/0075085 A1* | 4/2007 | Arnold et al. | 220/560.04 |
| 2007/0125786 A1* | 6/2007 | Akiyama et al. | 220/592.2 |
| 2007/0199941 A1* | 8/2007 | Reese | 220/560.1 |

FOREIGN PATENT DOCUMENTS

| | | |
|---|---|---|
| DE | 101 54 088 A1 | 5/2003 |
| DE | 10 2004 011 653 A1 | 9/2005 |
| EP | 0 424 533 A1 | 5/1991 |
| GB | 1023736 | 3/1966 |

* cited by examiner

INTERNAL HEATING OF A FLUID IN A STORAGE TANK

FIELD OF THE INVENTION

The invention relates generally to fluid storage tanks, and more particularly, to an improved storage tank including means for internally heating a fluid in the tank during extraction.

BACKGROUND OF THE INVENTION

Fuel cells have been proposed as a power source for electric vehicles and other applications. In proton exchange membrane (PEM) type fuel cells, hydrogen is supplied to an anode of the fuel cell and oxygen is supplied as an oxidant to a cathode. Large amounts of hydrogen are required to power the fuel cells of fuel cell powered vehicles. Typically, large quantities of hydrogen are stored at ambient temperature and at up to 70 MPa in high-pressure storage tanks disposed on an undercarriage of the vehicle.

To fill the storage tank with hydrogen and to extract hydrogen from the tank, inlet and outlet conduits adapted to facilitate fluid flow are disposed through a sidewall of the storage tank. The conduits are typically disposed through the sidewall with a portion inside the tank and a portion exposed to ambient air. A seal is typically disposed between the conduits and the sidewall to militate against leakage of fluid therebetween and heat transfer to the fluid being stored inside of the storage tank.

In a typical high-pressure storage tank, an amount of heat will enter the tank upon compression of the hydrogen in the tank during a tank filling operation. Similarly, the temperature of the hydrogen and the tank will decrease as the hydrogen is extracted from the tank. During tank filling and immediately thereafter, the hydrogen in the tank is at an elevated temperature. At a time after filling and during regular operation of the vehicle, the hydrogen in the tank is at ambient temperature. During extraction, the hydrogen can cool to as low as −80° C. At temperatures substantially lower than −40° C., the seal between the sidewall of the storage tank and the conduits can fail, allowing leakage of hydrogen to the environment. Therefore, as the hydrogen is extracted at a temperature colder than −40° C., the seal may be damaged allowing hydrogen leakage. Accordingly, there is a need for an improved high-pressure storage tank, and more particularly, a storage tank that minimizes damage to the seal.

It would be desirable to develop a high-pressure storage tank with a means for internally heating a fluid in the tank during an extraction thereof from the storage tank operation to militate against damage to a seal.

SUMMARY OF THE INVENTION

Concordant and congruous with the present invention, a high-pressure storage tank with a means for internally heating a fluid in the tank during an extraction thereof from the storage tank to militate against damage to a seal, has been discovered.

In one embodiment, A high-pressure storage tank comprises a storage tank having an outer surface, an inner surface, and a sidewall, wherein the sidewall forms a tank reservoir, said storage tank adapted to receive, store, and extract a fluid; and a first conduit disposed in the tank reservoir and at least a portion of said first conduit is disposed adjacent the inner surface of said storage tank, wherein heat is transferred from the sidewall to said first conduit to heat the fluid during an extraction thereof from said storage tank.

In another embodiment, a high-pressure storage tank comprises a storage tank having an outer surface, an inner surface, and a sidewall, wherein the sidewall forms a tank reservoir, said storage tank adapted to receive, store, and extract a fluid; a tank inlet having a seal disposed in the sidewall of said storage tank; a first conduit having a first portion disposed in the tank reservoir, a second portion disposed outside of said storage tank, wherein heat is transferred from the sidewall to said first conduit to heat the fluid during an extraction thereof from said storage tank; and wherein a temperature of the fluid flowing through the seal during the extraction operation is above a temperature at which thermal damage occurs to the seal.

In another embodiment, a high-pressure fluid storage tank comprises a storage tank having an outer surface, an inner surface, and a sidewall, wherein the sidewall forms a tank reservoir, said storage tank adapted to receive, store, and extract a fluid; a first conduit having a first portion disposed in the tank reservoir, a second portion disposed outside of said storage tank, wherein heat is transferred from the sidewall to said first conduit to heat the fluid during an extraction thereof from said storage tank; a second conduit having a first portion disposed in the tank reservoir, a second portion disposed outside of said storage tank, wherein heat is transferred from the sidewall to said first conduit to heat the fluid during an extraction thereof from said storage tank; and an inlet having a seal disposed in the sidewall of said storage tank, wherein the seal is disposed between said inlet and said first conduit and said second conduit.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
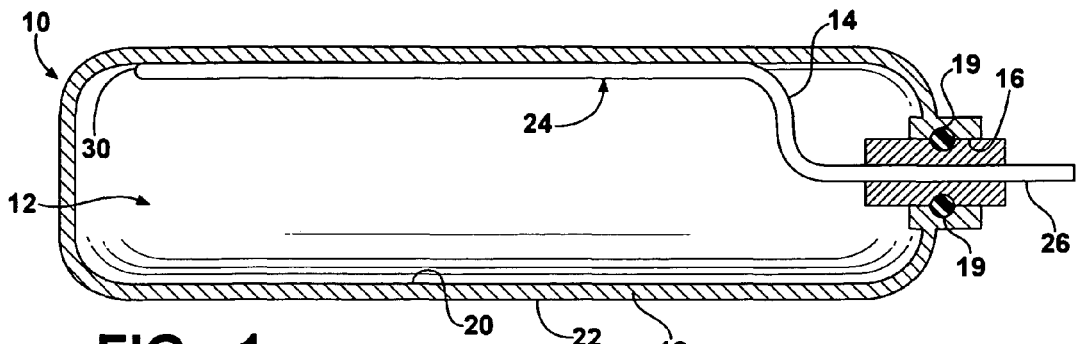
FIG. 1 is a sectional view of a high-pressure storage tank with a linear extraction conduit according to an embodiment of the invention.

FIG. 1 shows a storage tank 10 according to an embodiment of the invention. The storage tank 10 includes a reservoir 12, a tank inlet 16, and a first conduit 14. The reservoir 12 is formed by a sidewall 18 having an inner surface 20 and an outer surface 22. In the embodiment shown, the storage tank 10 has a substantially cylindrical shape with a circular cross-sectional shape. It is understood that storage tank 10 may have any shape and cross sectional shape as desired such as a triangular shape, a rectangular shape, an ovoid shape, and any other shape, for example. It is also understood that the sidewall 18 of the storage tank 10 may be surrounded by insulation (not shown) and an outer vessel (not shown) to provide additional insulation, as desired. It is also possible that an additional sealing material or liner (not shown) may be included in the tank 10 to minimize gas permeation.

The tank inlet 16 is an aperture formed by the sidewall 18. A seal 19 is disposed between the first conduit 14 and sidewall 18 to militate against leakage of the fluid (not shown) stored in the reservoir 12. The tank inlet 16 is adapted to receive the first conduit 14 therethrough. It is understood that the tank inlet 16 may also include conduits for filling the tank 10 with fluid (not shown), if necessary.

Figure 2:
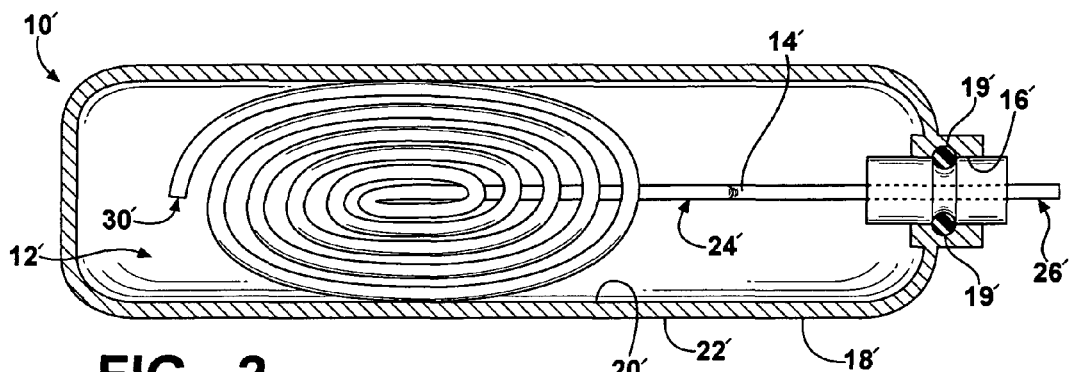
FIG. 2 is a top plan view of a high-pressure storage tank with a spiral extraction conduit according to another embodiment of the invention.
Figure 3:
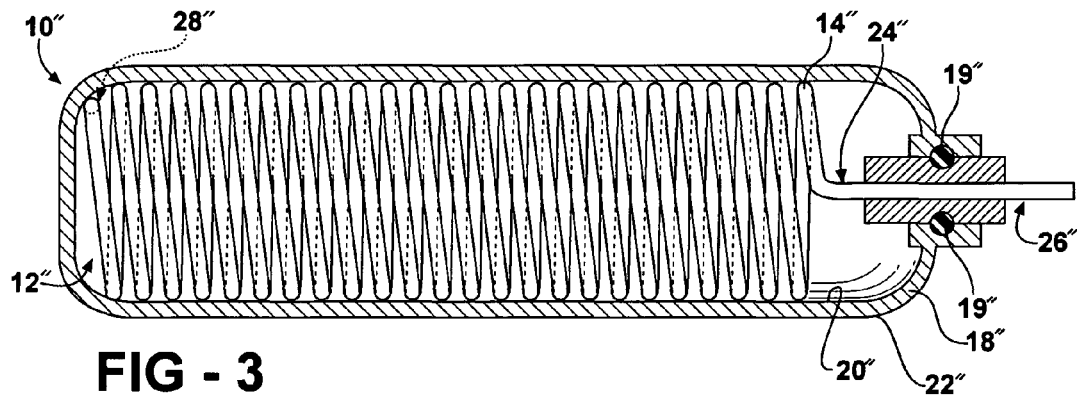
FIG. 3 is a sectional view of a high-pressure storage tank with a helical extraction conduit according to another embodiment of the invention.
Figure 4:
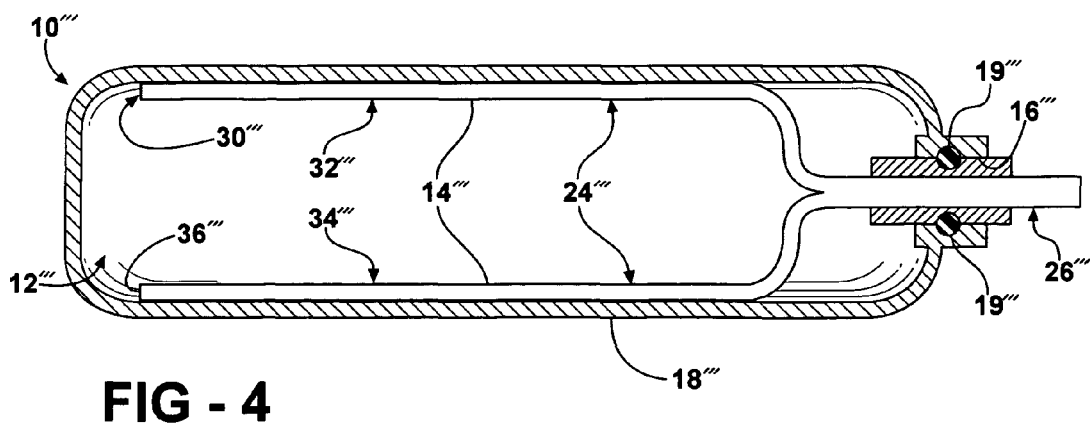
FIG. 4 is a sectional view of a high-pressure storage tank with a plurality of linear extraction conduits according to another embodiment of the invention.

In the embodiment shown, the first conduit 14 includes a first portion 24 and a second portion 26. The first conduit 14 extends through the tank inlet 16 of the storage tank 10 to provide fluid communication between the reservoir 12 and a source of fluid (not shown). The first portion 24 is substantially linear and includes an inlet 30 formed at a distal end thereof. The first conduit 14 is adapted to facilitate the removal of the fluid (not shown) from the storage tank 10. It is understood that the first portion 24 may have any configuration such as curvilinear, helical, and spiral wound, for example, as illustrated in FIGS. 2-4. It is also understood that the inlet 30 may also operate as an outlet, or both an inlet and an outlet, as desired. It is further understood that the first portion 24 may include a second inlet (not shown), as desired. It is further understood that the fluid may be any fluid such as a gaseous hydrogen, a gaseous oxygen, a gaseous nitrogen, a gaseous helium, a gaseous argon, or mixtures thereof, for example. The first portion 24 of the first conduit 14 is disposed in the reservoir 12 and abuts the inner surface 20 of the sidewall 18. The first portion 24 may also be disposed substantially adjacent the inner surface 20 without abutting the inner surface 20, if desired. The second portion 26 of the first conduit 14 is disposed outside the storage tank 10, and is in communication with the source of fluid. The first conduit 14 may have only a portion disposed inside the storage tank 10 and substantially abutting the inner surface 20 of the sidewall 18 and may not have a second portion 26 disposed outside the store tank 10, as desired. Also, the first conduit 14 may be joined to and in fluid communication with a conduit (not shown) disposed outside the storage tank 10 by a coupling (not shown) disposed in the sidewall 18 of the storage tank 10.

The temperature of the fluid in the reservoir 12 is typically ambient temperature after the tank has been filled and allowed to thermally equilibrate. During an extraction, the temperature in the reservoir 12 may range from −40° C. down to −80° C., with the highest temperatures measured at the sidewall 18. However, other temperature ranges can be used as desired. To avoid thermal damage to the seal 19 and leakage of the fluid in the storage tank 10, it is desirable to maintain a temperature of at least −40° C. at the seal 19. During extraction of the fluid from the storage tank 10, the fluid is caused to flow through the first conduit 14, and out of the storage tank 10. Since the first conduit 14 is disposed adjacent the sidewall 18, thermal energy is transferred from the sidewall 18 to the first portion 24 of the first conduit 14, thereby raising the temperature of the first portion 24 of the first conduit 14. Accordingly, as the fluid is extracted and flows through the first portion 24 of the first conduit 14, thermal energy is transferred to the fluid, and the fluid is heated. The amount of energy transferred from the first conduit 14 depends on a length of the first portion 24 of the first conduit 14. As the length of the first portion 24 of the first conduit 14 increases, the amount of energy transferred to the fluid increases. The fluid then flows through the tank inlet 16, and past the seals 19. Since the fluid has been heated in the first conduit 14 of the storage tank 10, thermal damage to the seals 19 caused by extremely cold temperatures is militated against.

FIG. 2 shows a storage tank 10' according to another embodiment of the invention. Like structure from FIG. 1 includes the same reference numerals with a prime (') symbol.

In the embodiment shown, a first portion 24' is substantially spiral shaped and includes an inlet 30' adapted to facilitate the removal of the fluid during extraction. It is understood that the first portion 24' may have any configuration such as curvilinear, helical, and spiral wound, for example, as desired. It is also understood that the inlet 30' may operate as an outlet, or both an inlet and an outlet, as desired. It is further understood that the first portion 24' may include a second inlet (not shown), as desired. The first portion 24', and inlet 30' of the first conduit 14' are disposed in the reservoir 12' and abut the inner surface 20'. The first portion 24' of the first conduit 14' is contoured such that the first portion 24' abuts the curvilinear inner surface 20' of the sidewall 18'. It is understood that the first portion 24' may be substantially adjacent the inner surface 20' without abutting the inner surface 20', as desired. The remaining structure, use, and advantages are substantially the same as described above for FIG. 1.

FIG. 3 shows a storage tank 10" according to another embodiment of the invention. Like structure from FIG. 1 includes the same reference numerals with a double prime (") symbol.

In the embodiment shown, a first portion 24" of the first conduit 14" is substantially helical shape and includes an inlet 30" adapted to facilitate the removal of the fluid during extraction. It is understood that the first portion 24" may have any configuration such as curvilinear, helical, and spiral wound, for example, as desired. It is also understood that the inlet 30" may operate as an outlet, or both an inlet and an outlet, as desired. It is further understood that the first portion 24" may include a second inlet (not shown), as desired. The first portion 24" and inlet 30" of the first conduit 14" are disposed in the reservoir 12", and is spiral wound around and abutting the inner surface 20". It is understood that the first portion 24" may be substantially adjacent the inner surface 20" without abutting the inner surface 20", as desired. The remaining structure, use, and advantages are substantially the same as described above for FIGS. 1 and 2.

FIG. 4 shows a storage tank 10''' according to another embodiment of the invention. Like the structure from FIG. 1 includes the same reference numerals with a triple prime ('''') symbol.

The storage tank 10''' includes a reservoir 12''', a tank inlet 16''', a first conduit 14'''. The reservoir 12''' is formed by a sidewall 18''', an inner surface 20''' and an outer surface 22'''. In the embodiment shown, the storage tank 10''' has a substantially cylindrical shape with a circular cross-sectional shape. It is understood that storage tank 10''' may have any shape and cross sectional shape as desired such as a triangular shape, a rectangular shape, an ovoid shape, and any other shape, for example. It is also understood that the sidewall 18''' of the storage tank 10''' may be surrounded by insulation (not shown) and an outer vessel (not shown) to provide additional insulation, as desired.

The tank inlet 16''' is an aperture formed by the sidewall 18'''. A seal 19''' is disposed between the first conduit 14''' and the sidewall 18''' to militate against leakage of the fluid (not shown) stored in the reservoir 12'''. The tank inlet 16''' is adapted to receive the first conduit 14''' therethrough. It is understood that the tank inlet 16''' may include insulation (not shown), as desired.

In the embodiment shown, the first conduit 14''' is in fluid communication with the reservoir 12''' and disposed through the tank inlet 16''' of the storage tank 10''' including a first portion 24''' and a second portion 26'''. The first portion 24''' has a first arm 32''' and a second arm 34''', each arm 32''', 34''' substantially linear. The first arm 32''' includes an inlet 30''' formed at a distal end thereof. The first arm 32''' is adapted to facilitate the removal of the fluid from the storage tank 10'''. The second arm 34''' includes an outlet 36''' formed at a distal end thereof. The second arm 34''' is adapted to facilitate the filling of the reservoir 12''' with the fluid. It is understood that it may not be desirable to heat the fluid flowing into the reservoir 12''' through the second arm 34''' and the second arm 34''' may not be disposed substantially adjacent the inner surface 20''', as desired. It is understood that the first arm 32''' and the second arm 34''' of the first portion 24''' may have any configuration such as curvilinear, helical, or spiral wound, for example. It is further understood that the shape of the first arm 32''' may be different than the shape of the second arm 34''', if desired. It is understood that the inlet 30''' and the outlet 36''' may be inlets, outlets, or both inlets and outlets, as desired. The first arm 32''' and inlet 30''' and the second arm 34''' and outlet 36''' of the first conduit 14''' are disposed in the reservoir 12''' and abut the inner surface 20'''. The arms 32''', 34''' may also be substantially adjacent the inner surface 20''' without abutting the inner surface 20''', if desired. It is also understood that the first conduit 14''' may have as many arms abutting or adjacent the inner surface 20''', as desired. It is further understood that the storage tank 10''' may include a second conduit (not shown) as desired. The second portion 26''' of the first conduit 14''' is disposed outside the storage tank 10''', and is in communication with the source of the fluid. The first conduit 14''' may have only a portion with the first arm 32''' and the second arm 34''' and disposed inside the storage tank 10''' and substantially abutting the inner surface 20''' of the sidewall 18''' and may not have a second portion 26''' disposed outside the store tank 10''', as desired. Also, the first conduit 14''' may be joined to and in fluid communication with a conduit (not shown) disposed outside the storage tank 10''' by a coupling (not shown) disposed in the sidewall 18''' of the storage tank 10'''.

The temperature of the fluid in the reservoir 12''' is typically ambient temperature after the tank has been filled and allowed to settle. During an extraction, the temperature in the reservoir 12''' may range from −40° C. down to −80° C., with the highest temperatures measured at the sidewall 18'''. However, other temperature ranges can be used as desired. To avoid thermal damage to the seal 19''' and the leakage of additional heat into the storage tank 10''', it is desirable to maintain a temperature of at least −40° C. During extraction of the fluid from the storage tank 10''', the fluid is caused to flow through the first arm 32''' of the first conduit 14''', and out of the storage tank 10'''. Since the first arm 32''' is disposed adjacent the sidewall 18''', thermal energy is transferred from the sidewall 18''' to the first arm 32''' of the first conduit 14''', thereby raising the temperature of the first arm 32''' of the first conduit 14'''. Accordingly, as the fluid flows through the first arm 32''' of the first conduit 14''', thermal energy is transferred to the fluid, and the fluid is heated. The amount of energy transferred from the first arm 32''' depends on a length of the first portion 24'''. As the length of the first arm 32''' increases, the amount of energy transferred to the fluid increases. It is understood that the second arm 34''' may also include an inlet 30''' and that the fluid flowing through the inlet 30''' and second arm 34''' would be heated as described above for the first arm 32'''. The fluid then flows through the tank inlet 16''', and past the seals 19'''. Since the fluid has been heated in the first arm 32''' of the first conduit 14''' in the storage tank 10''', thermal damage to the seals 19''' caused by extremely cold temperatures is militated against.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A high-pressure storage tank comprising:
   a storage tank having an outer surface, an inner surface, and a sidewall, wherein the sidewall forms a tank reservoir, said storage tank adapted to receive, store, and extract a fluid;
   a tank inlet having a rubber seal disposed in the sidewall of said storage tank;
   a first conduit having a first portion disposed in the tank reservoir abutting the inner surface, a second portion disposed outside of said storage tank, and a third portion abutting the rubber seal, the rubber seal providing a substantially fluid tight seal between the third portion of said first conduit and the sidewall of said storage tank, wherein the first portion of said first conduit has a nonperforated wall and is configured to transfer heat from the sidewall to said first conduit to heat the fluid during an extraction thereof from said storage tank; and
   wherein a temperature of the fluid flowing through the third portion of said first conduit adjacent the rubber seal during the extraction operation is above a temperature at which thermal damage occurs to the rubber seal.

2. The storage tank of claim 1, wherein the first portion of said first conduit is substantially linear.

3. The storage tank of claim 1, wherein the first portion of said first conduit is helical.

4. The storage tank of claim 1, wherein the first portion of said first conduit is spiral wound.

5. The storage tank of claim 1, further comprising a second conduit having a first portion disposed in the tank reservoir, a second portion disposed outside of said storage tank, and at least part of the first portion abutting the inner surface of said storage tank, wherein heat is transferred from the sidewall to said first conduit to heat the fluid during an extraction thereof from said storage tank.

6. The storage tank of claim 1, where the rubber seal sits in a first channel formed on an inner surface of said tank inlet.

7. The storage tank of claim 6, wherein said first conduit at the third portion has an outer diameter greater than an outer diameter of said first conduit at the first portion and the second portion.

8. The storage tank of claim 7, wherein the rubber seal sits in a second channel formed on an outer surface of said first conduit at the third portion.

9. The storage tank of claim 1, wherein the first portion of said first conduit has an inlet.

10. The storage tank of claim 1, wherein a length of the first portion of said first conduit abutting the inner surface of said storage tank is configured to transfer heat from the sidewall to said first conduit to heat the fluid during an extraction thereof from said storage tank and provide that a temperature of the fluid flowing through the third portion of said first conduit adjacent the rubber seal during the extraction operation is above a temperature at which thermal damage occurs to the rubber seal.

11. A high-pressure storage tank comprising:
   a storage tank comprising an inner surface and a tank inlet;
   a seal disposed in the tank inlet; and
   a conduit passing from outside said storage tank to inside said storage tank through the tank inlet, wherein said conduit comprises a first portion having a nonperforated wall that abuts the inner surface of said storage tank.

12. The high-pressure storage tank of claim 11, further comprising a pressurized fluid disposed within said storage tank.

13. The high-pressure storage tank of claim 12, wherein the pressurized fluid comprises a member selected from the group consisting of hydrogen, nitrogen, oxygen, helium, argon, and mixtures thereof.

14. The high-pressure storage tank of claim 12, further comprising a flow of the pressurized fluid through said conduit from inside said storage tank to outside said storage tank.

15. The high-pressure storage tank of claim 14, wherein a temperature of the flow of the pressurized fluid through said conduit at the tank inlet is above a temperature at which thermal damage occurs to said seal.

16. The high-pressure storage tank of claim 14, wherein heat is transferred from the inner surface to the flow of the pressurized fluid through said conduit.

17. The high-pressure storage tank of claim 11, wherein the first portion having a solid wall that abuts the inner surface of said storage tank is substantially linear, helical, or spiral wound.

18. A fluid storage tank comprising:
   a reservoir formed by a sidewall;
   an inlet in the sidewall with a seal disposed in said inlet; and
   a conduit having a nonperforated wall and passing from outside said reservoir to inside said reservoir, wherein a majority of said conduit within said reservoir abuts the sidewall.

19. The storage tank of claim 1, wherein a majority of the first portion of said first conduit abuts the inner surface.

20. The high-pressure storage tank of claim 11, wherein a majority of the first portion of said first conduit abuts the inner surface.

* * * * *